(12) United States Patent
Abe et al.

(10) Patent No.: US 10,936,664 B2
(45) Date of Patent: Mar. 2, 2021

(54) DIALOGUE SYSTEM AND COMPUTER PROGRAM THEREFOR

(71) Applicant: National Institute of Information and Communications Technology, Tokyo (JP)

(72) Inventors: Noriyuki Abe, Tokyo (JP); Kanako Onishi, Tokyo (JP); Kentaro Torisawa, Tokyo (JP); Canasai Kruengkrai, Tokyo (JP); Jonghoon Oh, Tokyo (JP); Ryu Iida, Tokyo (JP); Yutaka Kidawara, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 121 days.

(21) Appl. No.: 16/321,988

(22) PCT Filed: Jul. 26, 2017

(86) PCT No.: PCT/JP2017/027011
§ 371 (c)(1),
(2) Date: Jan. 30, 2019

(87) PCT Pub. No.: WO2018/034118
PCT Pub. Date: Feb. 22, 2018

(65) Prior Publication Data
US 2020/0183983 A1    Jun. 11, 2020

(30) Foreign Application Priority Data

Aug. 16, 2016    (JP) .............................. JP2016-159505

(51) Int. Cl.
*G06F 16/9032*    (2019.01)
*G10L 15/22*    (2006.01)
*G10L 15/26*    (2006.01)

(52) U.S. Cl.
CPC ........ *G06F 16/90332* (2019.01); *G10L 15/22* (2013.01); *G10L 15/26* (2013.01)

(58) Field of Classification Search
CPC ......... G10L 15/22; G06F 40/35; G06F 40/40; G06F 16/3329; G06F 16/90332
(Continued)

(56) References Cited

U.S. PATENT DOCUMENTS 8,543,565 B2 * 9/2013 Feng .................... G06F 16/3329
                                                  707/708
10,388,178 B2 * 8/2019 Graesser .................. G09B 7/04
(Continued)

FOREIGN PATENT DOCUMENTS

JP    2010002973 A    1/2010
JP    2016-045652 A    4/2016
(Continued)

OTHER PUBLICATIONS

H.Sugiyama et al., "Leveraging Dependency Relations and Sentence CI Examples in Web-scale Corpu for Open-domain Utterance Generation (in Japanese)," Transaction of the Japanese Society for Artificial Intelligence, vol. 30, No. 1, pp. 183-194, 2015 (w/ English Abstract).
(Continued)

*Primary Examiner* — Susan I McFadden
(74) *Attorney, Agent, or Firm* — Renner, Otto, Boisselle & Sklar, LLP

(57) ABSTRACT

A dialogue system includes: a question generating unit receiving an input sentence from a user and generating a question using an expression included in the input sentence, by using a dependency relation; an answer obtaining unit inputting the question generated by the question generating unit to a question-answering system and obtaining an answer to the question from question-answering system; and an
(Continued)

utterance generating unit for generating an output sentence to the input sentence, based on the answer obtained by the answer obtaining unit.

6 Claims, 11 Drawing Sheets

(58) Field of Classification Search
USPC .......................................................... 704/275
See application file for complete search history.

(56) References Cited

U.S. PATENT DOCUMENTS

| | | | |
|---|---|---|---|
| 10,540,967 B2 * | 1/2020 | Perez ...................... | G10L 15/22 |
| 2014/0351228 A1 | 11/2014 | Yamamoto | |
| 2017/0242915 A1 | 8/2017 | Torisawa et al. | |

FOREIGN PATENT DOCUMENTS

| | | |
|---|---|---|
| JP | 2016-099381 | 5/2016 |
| WO | 2013/080406 A1 | 6/2013 |

OTHER PUBLICATIONS

H. Sugiyama et al, "Open-domain Utterance Generation for C2 Conversational Dialogue Systems using Web-scale Dependency Structures," The 14th annual SIGdial Meeting on Discourse and Dialogue (Sigdial), pp. 334-338, 2013.

S. Higuchi et al., "A Casual Conversation System Using Modality and Word Associations Retrieved from the Web", Proceedings of the 2008 C3 Conference on Empirical Methods in Natural Language Processing, pp. 382-390, Honolulu, Oct. 2008. © 2008 Association for Computational Linguistics.

International Search Report for corresponding App. No. PCT/JP2017/027011, dated Oct. 24, 2017.

* cited by examiner

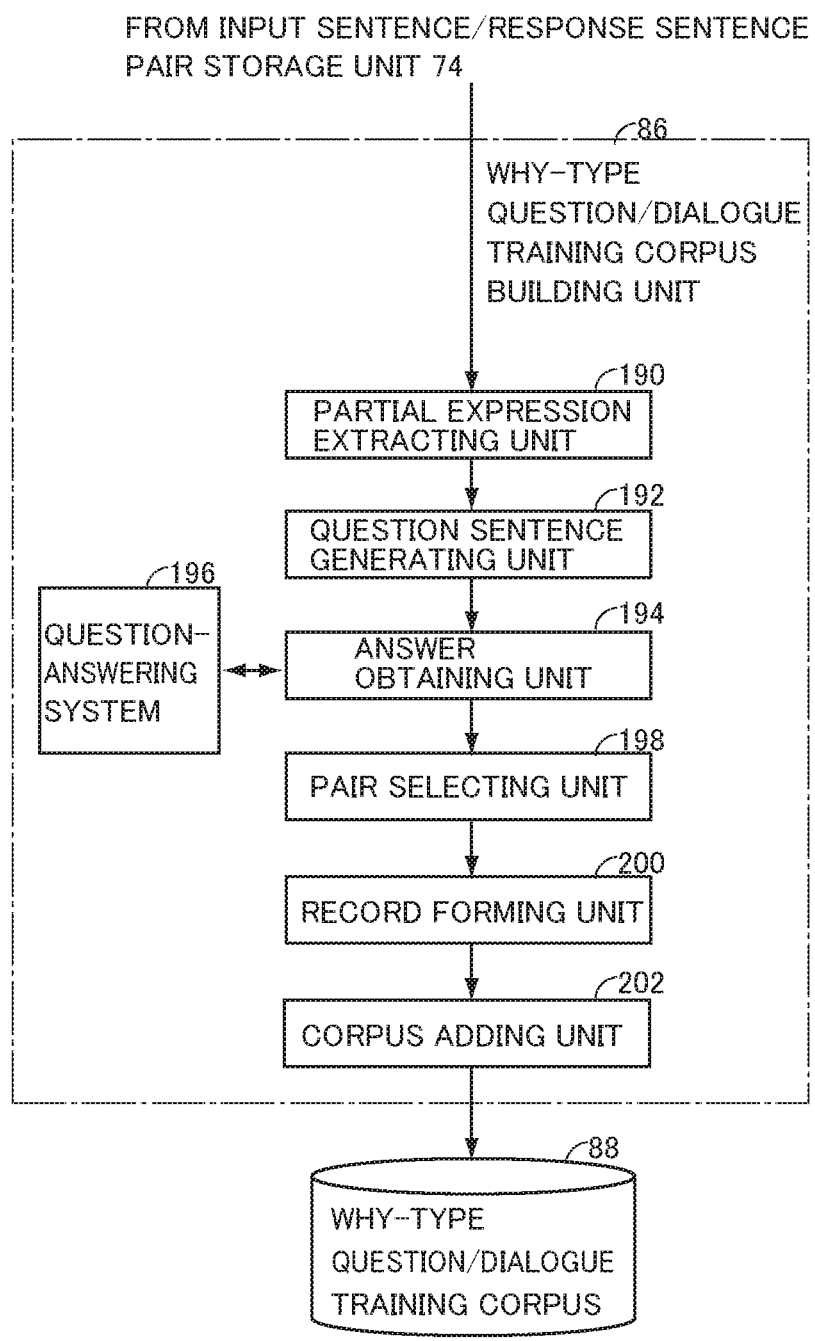

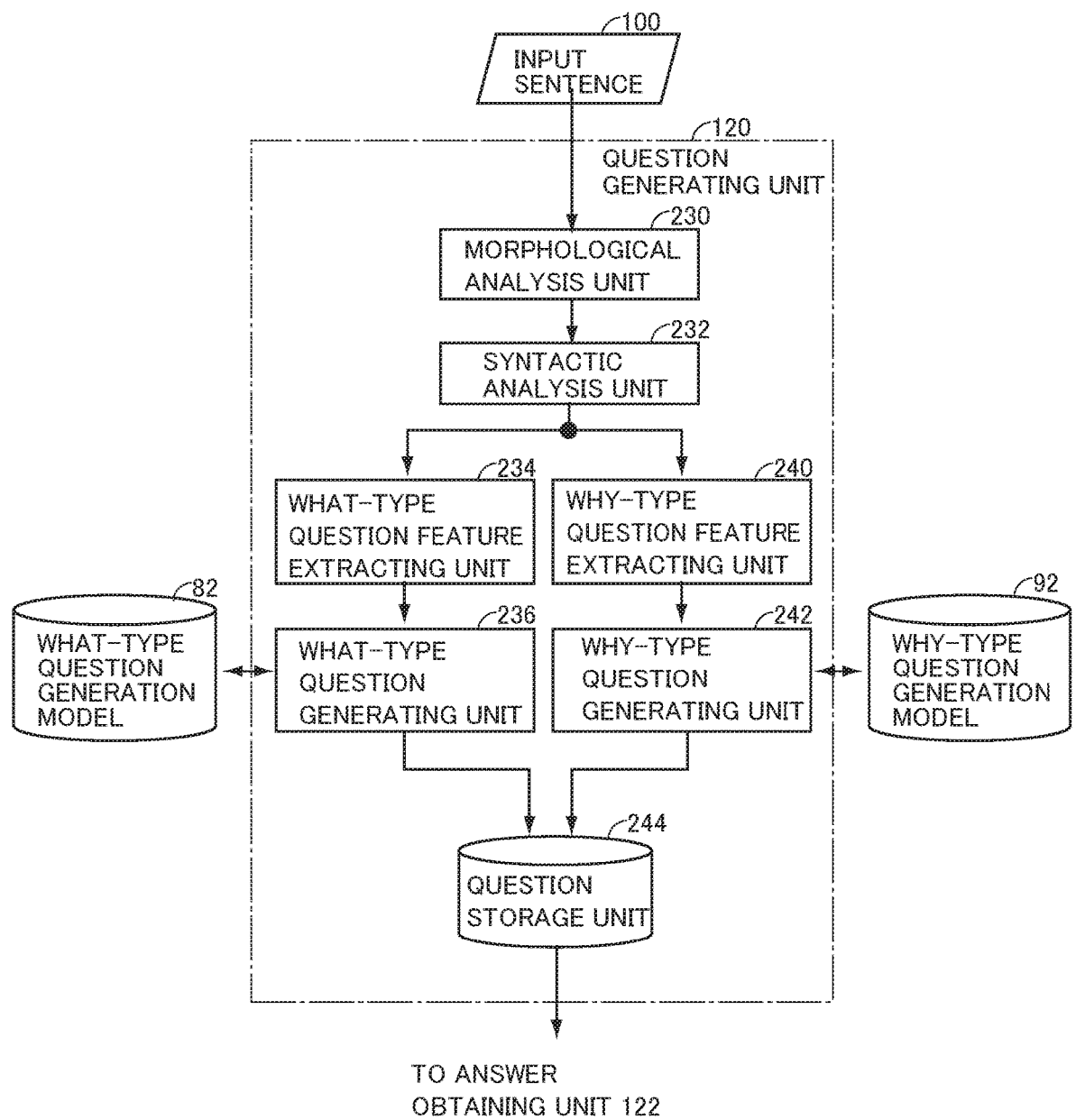

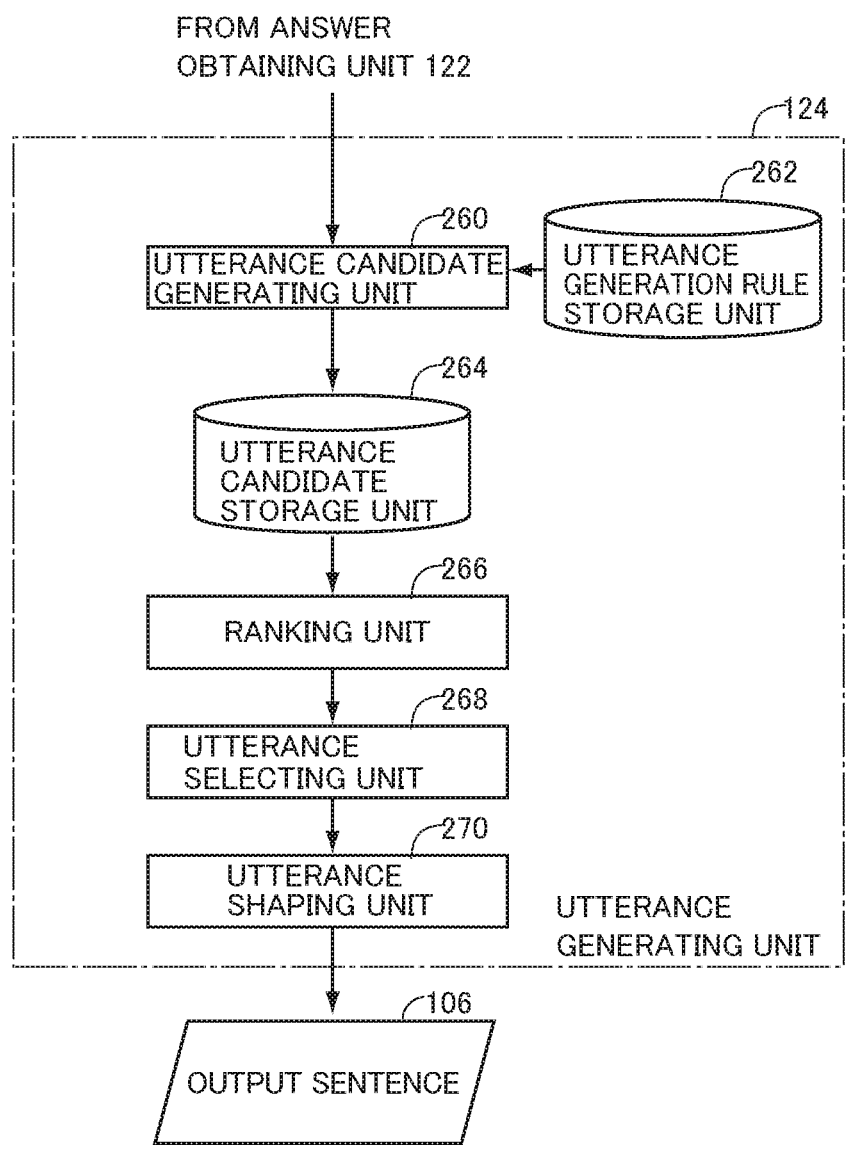

DIALOGUE SYSTEM AND COMPUTER PROGRAM THEREFOR

TECHNICAL FIELD

The present invention relates to a dialogue system engaging in a dialogue with a user and, more specifically, to a dialogue system allowing natural interaction.

BACKGROUND ART

Many attempts have been made to date to realize a system allowing a computer to engage in a dialogue with a user. The simplest approach is to prepare scripts having predetermined dialogue rules, and to cause a computer to make utterances in accordance with the scripts. A script includes a variable that is to be replaced by a word. A user utterance is subjected to speech recognition and a word is extracted from the speech to replace the variable, and thus a response is made. As can be easily understood, such a dialogue system has limited number of scripts and, therefore, response patterns are also limited. The possible number of cases in a dialogue is infinite and, therefore, natural interaction with such a system is impossible.

Another approach analyzes dependency of sentences in a large number of dialogue data and utilizes the results. For example, by analyzing a sentence "I bought a game machine today and I will play Marco Cargo ("Marco Cargo" is a name of a game), a combination of "I bought a game machine (today)" and "I will play Marco Cargo" is extracted and stored as a pattern. When an expression "I bought a game machine today" is found in a user's utterance in a dialogue, the expression "I will play Marco Cargo" that has been associated with this expression is extracted, and by modifying this, a system utterance such as "You can play Marco Cargo, can't you?" is generated.

In still another approach, keywords are extracted from user utterances, and results of keyword search are used for generating system utterances. For example, assume that the user utterance is "I am going to buy a game machine today." Then, web search is done using "game machine" and "buy" as keywords and a plurality of documents are collected. From these documents, a word (for example, "Marco Cargo") that appears close to a keyword is extracted. This word is put in a template prepared beforehand, and a system utterance is generated.

The above-described approaches, however, all suffer from a problem that a semantic relation (cause, effect, parataxis, etc.) of a user's utterance or dependency of sentences on a web is not correctly understood. This often leads to irrelevant system utterances. For instance, assume an utterance "I will go to Akihabara, buy a game machine and eat ramen." From this utterance, "buy a game machine" and "eat ramen" are extracted and these expressions are tentatively associated with each other. However, if a user utterance "I will buy a game machine today" is found and a system generates an utterance "You will eat ramen" based solely on the relation mentioned above, such an interaction is nonsense in a normal context, and a natural dialogue cannot be continued.

Approaches involving keyword search have a disadvantage in that the documents in the search results contain so large a vocabulary that the search results have many pieces of unnecessary information, making it difficult to extract the desired essential information. Further, since search results based on keywords included in user utterances are used, it is impossible to control the intention of the system utterance (for example, to provide information to the user, to give feedback, or to express sentiment).

Patent Literature 1 listed below proposes a solution to such problems. A speech dialogue system described in Patent Literature 1 includes: a speech recognition device for recognizing a user's utterance; an intention understanding unit for understanding the intention of an utterance using a pre-trained intention understanding model and problem-solving knowledge, in order to understand the intention of the utterance and to comprehend what type of information in a specific domain is requested; and a dialogue management unit for obtaining information for a response from an information source, in order to generate a response reflecting the intention. Patent Literature 1 cites a specific web site on the Internet and a review database storing comments and feedbacks of people about various movies, and either one is selected in accordance with the intention of the utterer. For instance, if a user's utterance expresses a desire to know a director of a movie, the director of the movie is searched for on the web site. If the user's utterance is to know reviews of the movie, reviews of the movie by other people are searched for in the review database.

The speech dialogue system described in Patent Literature 1 further includes dialogue scenarios describing dialogue flows indicating which interaction is to be taken, to various input intentions.

This system further includes: a response generating unit generating a response to an utterance by a user using information obtained by the dialogue management unit from the information source; a speech synthesizing unit generating a speech signal by speech synthesis of the response generated by the response generating unit; and a speaker converting the speech signal to a speech.

CITATION LIST

Patent Literature

PTL 1: JP2016-099381A (FIG. 2)

SUMMARY OF INVENTION

Technical Problem

The system described in Patent Literature 1 above collects answers to the user from a wide range. The scope, however, is limited to a specific domain (for example, movies). If the utterance of a counterpart is a question and its intention is easily determined, it may be possible to generate a meaningful response. If not, however, we cannot predict at all what response will be delivered. First of all, a dialogue in which a user can only utter questions is considered anything but natural. Therefore, this system cannot realize natural interaction with the user.

Therefore, an object of the present invention is to provide a dialogue system capable of engaging in a natural dialogue with a user based on the user's utterance, regardless of the topic of the utterance.

Solution to Problem

According to a first aspect, the present invention provides a dialogue system, including: a parameter generating means, responsive to an input utterance from a user, for generating a parameter for using a question-answering system by using an expression included in the input utterance; an answer obtaining means for obtaining an answer to the parameter by inputting the parameter generated by the parameter generating means to the question-answering system; and a response generating means for generating a response to the input utterance based on the answer obtained by the answer obtaining means.

Preferably, the parameter generating means includes: an utterance analysis means for performing a morphological analysis and a syntactic analysis on the input utterance; a subject estimating means for estimating a subject of the input utterance from a result of analysis by the utterance analysis means; and a factoid-type question generating means for generating, based on the subject estimated by the subject estimating means, a factoid-type question including a partial expression forming the subject.

More preferably, the parameter generating means includes: a partial expression specifying means for specifying a partial expression representing the input utterance, from a result of analysis by the utterance analysis means; and a non-factoid-type question generating means for generating, based on the partial expression specified by the partial expression specifying means, a non-factoid-type question.

More preferably the response generating means may include: an utterance candidate generating means for generating an utterance candidate by applying an utterance generating rule prepared in advance for the answer; and an utterance shaping means for shaping the utterance candidate in accordance with an utterance shaping rule prepared in advance, and thereby generating the response to the input utterance.

More preferably, the question-answering system outputs a plurality of answers to one parameter; and the response generating means includes an utterance candidate generating means for generating a plurality of utterance candidates by applying an utterance generation rule prepared in advance for each of the plurality of answers, and an utterance shaping means, selecting any of the plurality of utterance candidates, for shaping the utterance candidate in accordance with an utterance shaping rule prepared in advance, and thereby generating the response to the input utterance.

The response generating means may include: an utterance generation model learned in advance such that when an answer to a question is given, an utterance is generated from the answer; and an utterance shaping means for shaping the utterance generated by the utterance generation model in accordance with an utterance shaping rule prepared in advance, and thereby generating the response to the input utterance.

The question-answering system may output a plurality of answers to one parameter; and the response generating means may include: an utterance generation model trained in advance such that when an answer to a question is given, the response generating model generates an utterance from the answer; and an utterance shaping means, selecting any of the utterances generated corresponding to each of the plurality of answers by the utterance generation model, for shaping the utterance in accordance with an utterance shaping rule prepared in advance, and thereby generating the response to the input utterance.

According to a second aspect, the present invention provides a computer program causing a computer to function as any of the dialogue systems described above.

BRIEF DESCRIPTION OF DRAWINGS

FIG. 5 is a block diagram schematically showing a why-type question/dialogue training corpus building unit of the dialogue system in accordance with the first embodiment.

FIG. 6 is a block diagram schematically showing a question generating unit of the dialogue system in accordance with the first embodiment.

FIG. 7 is a block diagram schematically showing an utterance generating unit of the dialogue system in accordance with the first embodiment.

DESCRIPTION OF EMBODIMENTS

Figure 1:
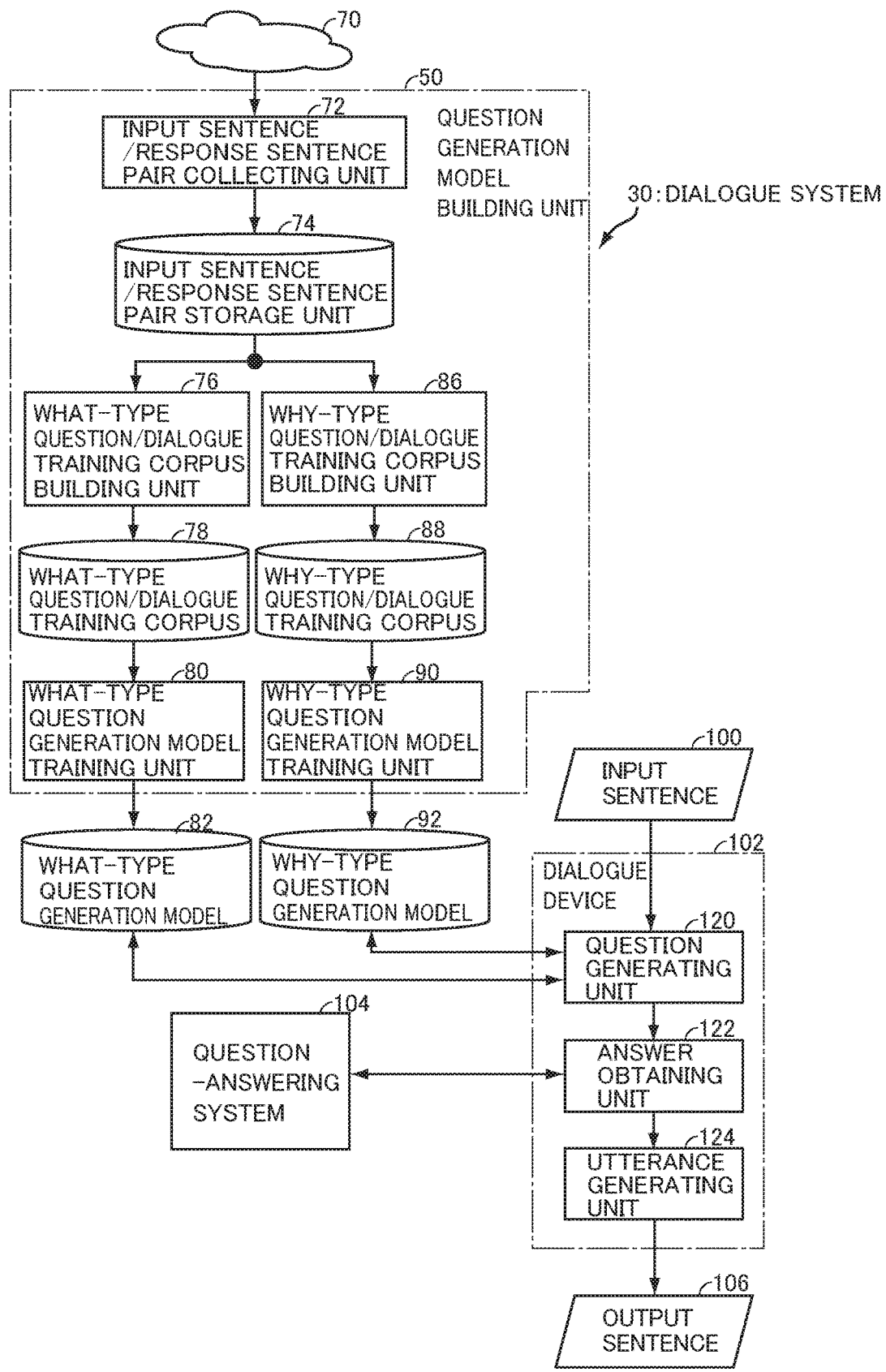
FIG. 1 is a block diagram showing an overall configuration of a dialogue system in accordance with a first embodiment of the present invention.

In the following description, the same components are denoted by the same reference characters. Therefore, detailed description thereof will not be repeated. In the following embodiments, a what-type question is discussed as an example of a factoid-type question, and a why-type question will be discussed as an example of a non-factoid-type question. The present invention, however, is not limited to such embodiments. For example, a factoid-type question may be any question that asks about a fact (for example, questions accompanying "who", "when", "where"). A non-factoid-type question may involve "what-if" type or "how" type questions, in addition to the why-type questions.

[First Embodiment]
<Configuration>

Referring to FIG. 1, a dialogue system 30 in accordance with the first embodiment of the present invention includes: a question generation model building unit 50 connected to the Internet 70 for training a what-type question generation model 82 and a why-type question generation model 92; and a dialogue device 102 generating, from an input sentence 100 input by a user, a series of questions by using what-type question generation model 82 and why-type question generation model 92, receiving their answers from question-answering system 104 and generating and outputting an output sentence 106 for the input sentence 100 using the answers.

<Question Generation Model Building Unit 50>

Question generation model building unit 50 includes: an input sentence/response sentence pair collecting unit 72 connected to the Internet 70 for collecting a huge number of pairs (input sentence/response sentence pairs) each consisting of a sentence (referred to as an "input sentence") and a response sentence to the input sentence, from dialogues by a huge number of users on webs and SNS's on the Internet 70 and the like; and an input sentence/response sentence pair storage unit 74 for storing the huge number of input sentence/response sentence pairs collected by input sentence/response sentence pair collecting unit 72.

Question generation model building unit 50 further includes: a what-type question/dialogue training corpus building unit 76 for building a what-type question/dialogue training corpus 78 based on the huge number of input sentence/response sentence pairs stored in input sentence/response sentence pair storage unit 74; and a what-type question generation model training unit 80 for training what-type question generation model 82 using the what-type question/dialogue training corpus 78.

Question generation model building unit 50 further includes: a why-type question/dialogue training corpus building unit 86 for building a why-type question/dialogue training corpus 88 based on the huge number of input sentence/response sentence pairs stored in input sentence/response sentence pair storage unit 74; and a why-type question generation model training unit 90 for training why-type question generation model 92 using the why-type question/dialogue training corpus building unit 86.

«Input Sentence/Response Sentence Pair Collecting Unit 72»

Figure 2:
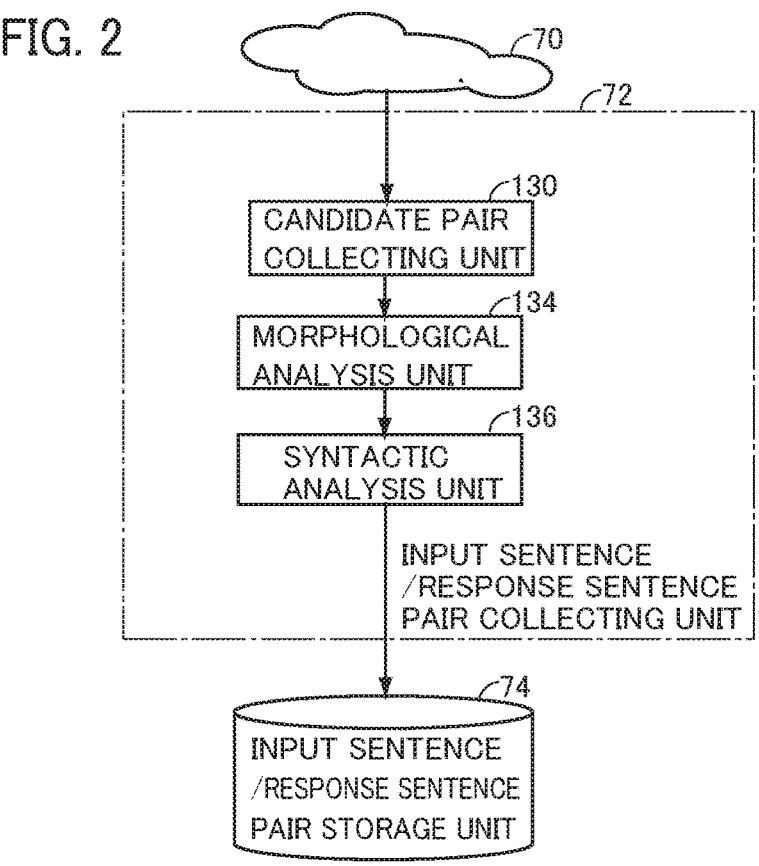
FIG. 2 is a block diagram schematically showing a configuration of an input sentence/response sentence pair collecting unit of the dialogue system in accordance with the first embodiment.

Referring to FIG. 2, input sentence/response sentence pair collecting unit 72 includes: a candidate pair collecting unit 130 for collecting a huge number of candidates (candidate pairs) of input sentence/response sentence pairs from the Internet 70; a morphological analysis unit 134 for performing a morphological analysis on each sentence in the input sentence/response sentence pairs collected by candidate pair collecting unit 130; and a syntactic analysis unit 136 for performing a syntactic analysis on each sentence and storing the input sentence/response sentence pairs having part of speech information and syntactic information added, in input sentence/response sentence pair storage unit 74.

«What-Type Question/Dialogue Training Corpus Building Unit 76»

Figure 3:
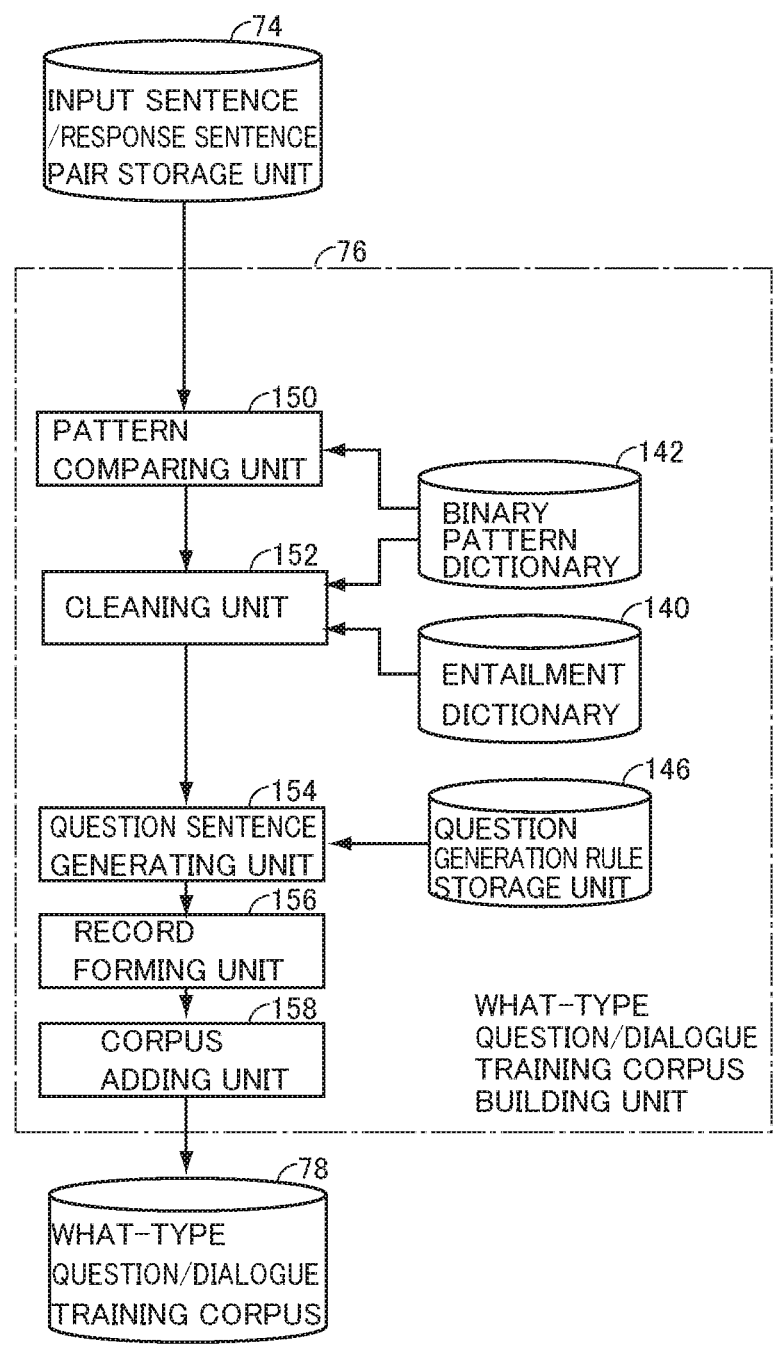
FIG. 3 is a block diagram schematically showing a configuration of a what-type question/dialogue training corpus building unit of the dialogue system in accordance with the first embodiment.

Referring to FIG. 3, what-type question/dialogue training corpus building unit 76 includes: an entailment dictionary 140 storing pieces of information indicating entailment or synonym relations between predicates, such as "playing" entails "pleasure"; a binary pattern dictionary 142 storing a large number of combinations (referred to as "binary triple") of a binary pattern, which is an expression consisting of two variables (A, B). and a predicate such as "play B with A" and a pair of words corresponding to variables A and B that co-occur with the binary pattern in an actual corpus; and a pattern comparing unit 150 for comparing, for each of the input sentence/response sentence pair read from input sentence/response sentence pair storage unit 74, whether each combination of a word included in the input sentence and a word included in the response sentence has a counterpart binary triple that includes a combination of words matching that combination stored in binary pattern dictionary 142, and if there exists such a binary triple, adopting the input sentence/response sentence pair and the matching binary triple, and if not, doing nothing (discarding).

Assume, for example, that the input sentence is "I bought a game machine" and the response sentence is "You can play Marco Cargo, can't you?" If there is a binary triple that includes the combination of a binary pattern ="play B by A", A ="game machine" and B ="Marco Cargo", then this combination of input sentence and response sentence is adopted. The binary triple is also output together. If there is no such pattern, the combination of input sentence and response sentence is discarded. Note that the binary pattern dictionary is formed from a corpus different from the question/dialogue training corpus.

What-type question/dialogue training corpus building unit 76 further includes: a cleaning unit 152 using entailment dictionary 140 and binary pattern dictionary 142, for discarding pairs that are highly likely noises from among the candidate pairs output from pattern comparing unit 150 and adopting and outputting other pairs; a question sentence generating unit 154 for generating, based on the input sentence/response sentence pairs adopted by cleaning unit 152, question sentences with reference to question generation rules stored in question generation rule storage unit 146; a record forming unit 156 for forming, for each of the question sentences generated by question sentence generating unit 154, a record to be added to the corpus with associated information; and a corpus adding unit 158 for adding the record formed by record forming unit 156 to what-type question/dialogue training corpus 78.

The record formed by record forming unit 156 has, for example, such a format as shown in Table 1 below. Each record is stored also in this format in what-type question/dialogue training corpus 78.

TABLE 1

| Input Sentence | Response Sentence | Binary Pattern | A | B | Question | Type |
|---|---|---|---|---|---|---|
| I bought a game machine | Then we can play Marco Cargo together | play B with A | game machine | Marco Cargo | What do you play with the game machine? | what |
| I bought a game machine in Akihabara | Then you can play Marco Cargo | play B with A | game machine | Marco Cargo | What do you play with the game machine? | what |
| I will buy a motor of Tamaya | Let us build a fast 4WD mini car | build B with A | motor | 4WD mini car | What do you build with the motor? | what |

Figure 4:
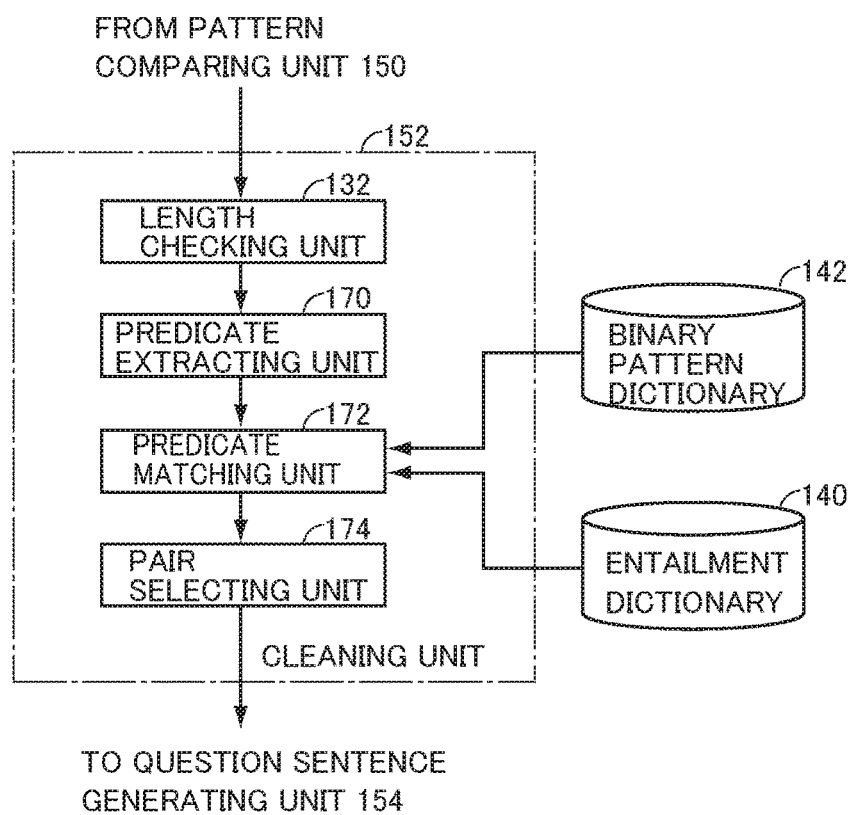
FIG. 4 is a block diagram schematically showing a configuration of a pattern comparing unit of the dialogue system in accordance with the first embodiment.

Referring to FIG. 4, cleaning unit 152 shown in FIG. 3 includes: a length checking unit 132 for discarding those of the input sentence/response sentence pairs read from input sentence/response sentence pair storage unit 74 of which response sentence includes 15 or more words, and for adopting others; a predicate extracting unit 170 for extracting a predicate included in a response sentence of each of the input sentence/response sentence pairs adopted by length checking unit 132; a predicate matching unit 172 for matching a predicate extracted by predicate extracting unit 170 with a predicate in each of the binary patterns stored in binary pattern dictionary 142, considering entailment relation/synonym relation with reference to entailment dictionary 140; and a pair selecting unit 174 for selecting, when a matching binary pattern is found in binary pattern dictionary 142 by predicate matching unit 172, a pattern consisting of the input sentence/response sentence pair that is being processed, the predicate extracted from the pair and a set of words selected from the input sentence/response sentence pairs in accordance with the matching binary pattern, as a training pair, and applying it to question sentence generating unit 154. Here, if at least one matching pair is found in binary pattern dictionary 142, the pair is adopted.

Here, "matching" means the following. Consider a binary pattern "play B with A." This binary pattern includes a combination of one variable and one predicate, that is, "play B." By replacing the variable B with a corresponding variable (for example, "a game"), a combination of one word and one predicate "play a game" is formed. This is called a "u-nary phrase generated from a binary pattern" or simply "u-nary phrase." If a response sentence of an input sentence/response sentence pair includes a u-nary phrase in an input sentence/response sentence pair, this response sentence is regarded as "matching" the binary pattern as the source of the u-nary phrase. The same is true when a response sentence has a u-nary pattern in which the predicate portion is replaced by a word having an entailment or synonym relation.

«Why-Type Question/Dialogue Training Corpus Building Unit 86»

Referring to FIG. 5, why-type question/dialogue training corpus building unit 86 includes: a partial expression extracting unit 190 for reading input sentence/response sentence pairs from input sentence/response sentence pair storage unit 74 and extracting a partial expression representing a subject of the pair with reference to dependency information or the like; and a question sentence generating unit 192 for generating a question sentence by modifying in a prescribed manner the partial expression extracted by partial expression extracting unit 190. The modification by question sentence generating unit 192 is, for example, to add expressions such as "why," "what if," "how" or the like to the partial expression.

Why-type question/dialogue training corpus building unit 86 further includes: a question-answering system 196; an answer obtaining unit 194 for obtaining an answer from question-answering system 196 by giving a question generated by question sentence generating unit 192 to question-answering system 196; a pair selecting unit 198 for selecting, when the question sentence given to question-answering system 196 and the answer sentence from question-answering system 196 have a prescribed number or more common words, the input sentence/response sentence pair that is being processed, and for discarding other input sentence/response sentence pairs; a record forming unit 200 for forming a record to be stored in why-type question/dialogue training corpus 88 from the input sentence/response sentence pair selected by pair selecting unit 198; and a corpus adding unit 202 for adding the record formed by record forming unit 200 to database forming why-type question/dialogue training corpus 88.

The record format of why-type question/dialogue training corpus 88 is, in the present embodiment, as shown in Table 2 below.

TABLE 2

| Input Sentence | Response Sentence | Partial Expression | Answer | Question | Type |
|---|---|---|---|---|---|
| I am going to Akihabara | They say you can buy a PC at a | go to Akihabara | because a PC is at a bargain | Why do you go to Akihabara? | why |

TABLE 2-continued

| Input Sentence | Response Sentence | Partial Expression | Answer | Question | Type |
|---|---|---|---|---|---|
| today I am going to Yodogawa in Akihabara | bargain Some take time to go there to buy a PC | go to Yodogawa in Akihabara | buy a PC | What if you go to Yodogawa in Akihabara? | what if |
| I will buy motor of Tamaya | a let us build a fast 4WD mini car | build B with A | motor | What do you build with the motor? | what |

<Dialogue Device 102>
«Question Generating Unit 120»

Referring to FIG. 6, question generating unit 120 of dialogue device 102 shown in FIG. 1 includes: a morphological analysis unit 230 for performing a morphological analysis on an input sentence 100; and a syntactic analysis unit 232 for performing a syntactic analysis on the input sentence 100 that has been subjected to a morphological analysis by morphological analysis unit 230, and outputting the same with syntactic analysis information added.

Question generating unit 120 further includes: a what-type question feature extracting unit 234 for extracting features for a what-type question from the input sentence 100 having the syntactic information added by syntactic analysis unit 232; a what-type question generating unit 236 generating a what-type question based on question hypotheses and their likelihood information output from what-type question generation model 82 by inputting a feature vector consisting of the features extracted by what-type question feature extracting unit 234 to what-type question generation model 82; a why-type question feature extracting unit 240 for extracting features for a why-type question from the input sentence 100; a why-type question generating unit 242 for generating a why-type question based on question hypotheses and their likelihood information output from why-type question generation model 92 by inputting a feature vector consisting of the features extracted by why-type question feature extracting unit 240 into why-type question generation model 92; and a question storage unit 244 storing the what-type questions generated by what-type question generating unit 236 and the why-type questions generated by why-type question generating unit 242.

«Utterance Generating Unit 124»

Referring to FIG. 7, utterance generating unit 124 of dialogue device 102 shown in FIG. 1 includes: an utterance generation rule storage unit 262 storing in advance a plurality of rules for generating utterance candidates from a question sentence; an utterance candidate generating unit 260 for generating a plurality of utterance candidates by applying the utterance generation rules stored in utterance generation rule storage unit 262, to an answer applied from answer obtaining unit 122; an utterance candidate storage unit 264 for storing utterance candidates generated by utterance candidate generating unit 260; a ranking unit 266 for scoring and ranking the utterance candidates stored in utterance candidate storage unit 264 in accordance with some criterion; an utterance selecting unit 268 selecting the utterance candidate ranked highest by ranking unit 266; and an utterance shaping unit 270 for generating an output sentence 106, by shaping the utterance selected by utterance selecting unit 268 by adding a colloquial expression and the like suitable for a dialogue. The shaping by utterance shaping unit 270 may include addition of a colloquial expression such as "don't you" or "isn't it" at the end of the sentence.

The manner of ranking by ranking unit 266 is, by way of example, as follows. A response sent from question-answering system 104 to answer obtaining unit 122 has a score indicating the degree as to how plausible the response is to the question. On the other hand, the utterance generation rules stored in utterance generation rule storage unit 262 shown in FIG. 7 have their importance added beforehand as weights.

Basically, ranking unit 266 ranks based on a product of these two. Though not shown, naturalness of utterance may be added to each utterance candidate by using a language model, and it may be additionally used for ranking.

[Operation]

Dialogue system 30 described above operates in the following manner. Roughly speaking, dialogue system 30 has two operational phases: a training phase and a service phase.

<Training Phase>

In the training phase, what-type question generation model 82 and why-type question generation model 92 are trained as described in the following.

Question generation model building unit 50 shown in FIG. 1 operates in the following manner. Referring to FIG. 2, candidate pair collecting unit 130 of input sentence/response sentence pair collecting unit 72 cruises various web sites (particularly, sites mainly containing postings and responses thereto) on the Internet 70, and collects pairs of candidates each consisting of an input sentence and its response sentence. The collected candidate pairs are applied to morphological analysis unit 134.

Morphological analysis unit 134 performs a morphological analysis both on the input sentence and the response sentence of a given candidate pair, and applies the resulting morphological sequences to syntactic analysis unit 136. Syntactic analysis unit 136 performs a syntactic analysis both on the input sentence and the response sentence included in each pair and stores the pairs with the results of the syntactic analysis added in input sentence/response sentence pair storage unit 74.

Referring to FIG. 3, pattern comparing unit 150 of what-type question/dialogue training corpus building unit 76 extracts words existing in each of the input sentence and response sentence of a candidate pair read from input sentence/response sentence pair storage unit 74, and determines whether there is any binary pair in the binary pairs stored in binary pattern dictionary 142 matching the combination of extracted words. If any, pattern comparing unit 150 applies the candidate pair and the binary pattern corresponding to the matching binary pair, to cleaning unit 152. If there is no such binary pair, binary pattern dictionary 142 does not take any action on the candidate pair (discards).

Referring to FIG. 4, length checking unit 132 determines whether the response sentence of the candidate pair has 15 or more words. Length checking unit 132 discards any candidate pair of which response sentence contains 15 or more words, and applies those having less than 15 words to question sentence generating unit 154. Predicate extracting unit 170 extracts a predicate included in the response sentence from the input sentence/response sentence pair applied from binary pattern dictionary 142, and applies it to predicate matching unit 172. Predicate matching unit 172 searches binary pattern dictionary 142 for a binary pattern having a matching predicate. Here, predicate matching unit 172 searches binary pattern dictionary 142 for not only the extracted predicate but also words having entailment relation (disregarding a hierarchy of entailment) and words having a synonym relation with the extracted predicate, with reference to entailment dictionary 140.

If a matching binary pattern is found, predicate matching unit 172 applies the result, and if there is no matching binary pattern, applies the result indicating absence, to pair selecting unit 174. If any matching binary pair is found, pair selecting unit 174 applies the input sentence/response sentence pair to question sentence generating unit 154 and if not, does not take any action (discards it).

By such processes by pattern comparing unit 150 and cleaning unit 152, the corpus for training what-type question/dialogue leaning corpus 78 can be prevented from becoming noisy. Such a cleaning process for the training data, however, may be omitted.

Referring to FIG. 3, receiving the input sentence/response sentence pair from cleaning unit 152, question sentence generating unit 154 generates a question sentence by applying an applicable rule among the question generation rules stored in question generation rule storage unit 146. Here, a plurality of question sentences may be generated. Since a binary pattern is a simple pattern, the question generation rules may be relatively simple. For example, given a binary pattern "play B with A," rules may be to replace a part of the variables with an interrogative such as "what do you play with A" or "why do you play B," and modify the last part of the sentence such that it sounds like a question, if necessary.

Record forming unit 156 forms a record of a prescribed format by collecting the input sentence and the response sentence forming an input sentence/response sentence pair, a binary pair, a pair of words corresponding to the variables in the binary pair in the input sentence/response sentence pair, a question sentence, and a question type, and applies the record to corpus adding unit 158. Corpus adding unit 158 adds the record to what-type question/dialogue training corpus 78.

What-type question generation model training unit 80 shown in FIG. 1 generates training data for training what-type question generation model 82, from a large number of records stored in this what-type question/dialogue training corpus 78, and trains the what-type question generation model 82. This training is done to train what-type question generation model 82 such that it becomes a statistic model that generates, given an input sentence, hypotheses of a question and their likelihood information. Though details will not be described as to what features are used for training here, basically, this model is considered to be a translation model in which an input sentence is a source language and a question sentence is a target language. Therefore, it can be trained using the same features and applying the same technique as in the case of a translation model for machine translation. Naturally, models such as language models used in common translation must be separately prepared for the input sentence and the question sentence. These are not shown here, however, for simplicity of drawings.

While this model can be trained by the same scheme as that for machine translation, the source language and the target language are the same here and, therefore, when a question sentence is generated by using this model, it is common that partial expressions (word, word sequence, predicate or the like) of an input sentence also appear in the question sentence. Such a characteristic is observed not only in what-type question generation model 82 but also commonly observed in other models in which the source language and the target language are the same.

Referring to FIG. 5, why-type question/dialogue training corpus building unit 86 shown in FIG. 1 operates in the following manner. Partial expression extracting unit 190 reads input sentence/response sentence pairs one by one from input sentence/response sentence pair storage unit 74, extracts a portion representing the subject of the pair from the input sentence using a dependency relation, and applies it to question sentence generating unit 192. Question sentence generating unit 192 modifies the partial expression extracted by partial expression extracting unit 190 in a prescribed manner and thereby generates a question sentence. The modification by question sentence generating unit 192 is to add an expression such as "why", "what if" or "how" to the partial expression.

Further, answer obtaining unit 194 applies the question sentence generated by question sentence generating unit 192 to question-answering system 196, obtains an answer from question-answering system 196, and applies the answer to pair selecting unit 198. If the question sentence applied to question-answering system 196 and the answer sentence from question-answering system 196 contain a prescribed number or more words in common, pair selecting unit 198 selects the pair of input sentence/response sentence that is being processed. Pair selecting unit 198 does nothing on other input sentence/response sentence pairs (discards them). Record forming unit 200 forms a record to be stored in why-type question/dialogue training corpus 88 from the input sentence/response sentence pair selected by pair selecting unit 198, in a manner similar to that of record forming unit 156 of what-type question/dialogue training corpus building unit 76 shown in FIG. 3. Corpus adding unit 202 adds the record formed by record forming unit 200 to the database forming the why-type question/dialogue training corpus 88.

Once why-type question/dialogue training corpus 88 is complete, why-type question generation model training unit 90 trains why-type question generation model 92, using the why-type question/dialogue training corpus 88. Why-type question generation model 92 is a statistic model that outputs, given an input sentence, why-type question hypotheses corresponding to the input sentence and their likelihood information. Therefore, why-type question generation model training unit 90 uses each input sentence of why-type question/dialogue training corpus 88 as an input, and uses question sentences of why-type question/dialogue training corpus 88 as teacher data, to train why-type question generation model 92. This model is also basically a translation model having an input sentence as a source language and a question sentence as a target language. While the language models for the input sentence and the question sentence at the time of translation, they are not shown here for simplicity of drawings.

When training of what-type question generation model 82 and why-type question generation model 92 is complete, dialogue by dialogue device 102 becomes possible.

Other models are also statistic models and hence, they can be trained in a similar manner as above. The problem here is what types of features are to be used for training. Considering common natural language processing, however, use of word n-grams, part of speech n-grams, word n-grams or part of speech n-grams on a path of the syntactic tree may be used. As teacher data, generally, correct answers are given manually. If any program tool that can estimate data usable as teacher data is available, training data can be enriched by using it.

<Dialogue by Dialogue Device 102>

Referring to FIG. 6, when an input sentence 100 is given by a user, morphological analysis unit 230 of question generating unit 120 performs a morphological analysis of the input sentence 100. Syntactic analysis unit 232 performs a syntactic analysis based on the morpheme sequence output from morphological analysis unit 230, and applies the results to what-type question feature extracting unit 234 and why-type question feature extracting unit 240.

What-type question feature extracting unit 234 extracts features for a what-type question from the input sentence 100 having syntactic analysis information added by syntactic analysis unit 232. What-type question generating unit 236 generates a what-type question, based on question hypotheses and their likelihood information output from what-type question generation model 82 by inputting a feature vector consisting of the features extracted by what-type question feature extracting unit 234 to what-type question generation model 82. In parallel with this operation, why-type question feature extracting unit 240 extracts features for a why-type question from the input sentence 100. Why-type question generating unit 242 generates a why-type question, based on question hypotheses and their likelihood information output from why-type question generation model 92 by inputting a feature vector consisting of the features extracted from why-type question feature extracting unit 240 to why-type question generation model 92. Question storage unit 244 stores both the what-type questions generated by what-type question generating unit 236 and the why-type questions generated by why-type question generating unit 242.

Referring to FIG. 7, utterance generation rule storage unit 262 of utterance generating unit 124 stores in advance a plurality of rules for generating utterance candidates from a question sentence. Utterance candidate generating unit 260 applies the utterance generation rules stored in utterance generation rule storage unit 262 to an answer applied from answer obtaining unit 122 and thereby generates a plurality of utterance candidates. Utterance candidate storage unit 264 stores utterance candidates generated by utterance candidate generating unit 260. Ranking unit 266 ranks the utterance candidates stored in utterance candidate storage unit 264 in accordance with some criterion. Utterance selecting unit 268 selects the utterance candidate ranked highest by ranking unit 266. Utterance shaping unit 270 shapes the utterance selected by utterance selecting unit 268 by adding a colloquial expression and the like suitable for a dialogue, and thereby generates an output sentence 106.

As described above, according to the present embodiment, an output sentence is generated not only from information considered to be related to an input sentence. From the input sentence, a question sentence is once generated, which is then applied to the question-answering system and an answer is obtained. This question is generated by removing unnecessary information from the user's utterance and is based on information frequently encountered on the Web. Thus, it clearly represents the intention of the user's utterance in the input sentence. The question-answering system outputs an answer having a relevant relation to the question. Using this answer, an output sentence to the user's utterance is generated. Since a question is generated, the relation between the user's utterance and the system utterance can be correctly grasped and the flow of dialogue can appropriately be controlled.

[Second Embodiment]

Figure 8:
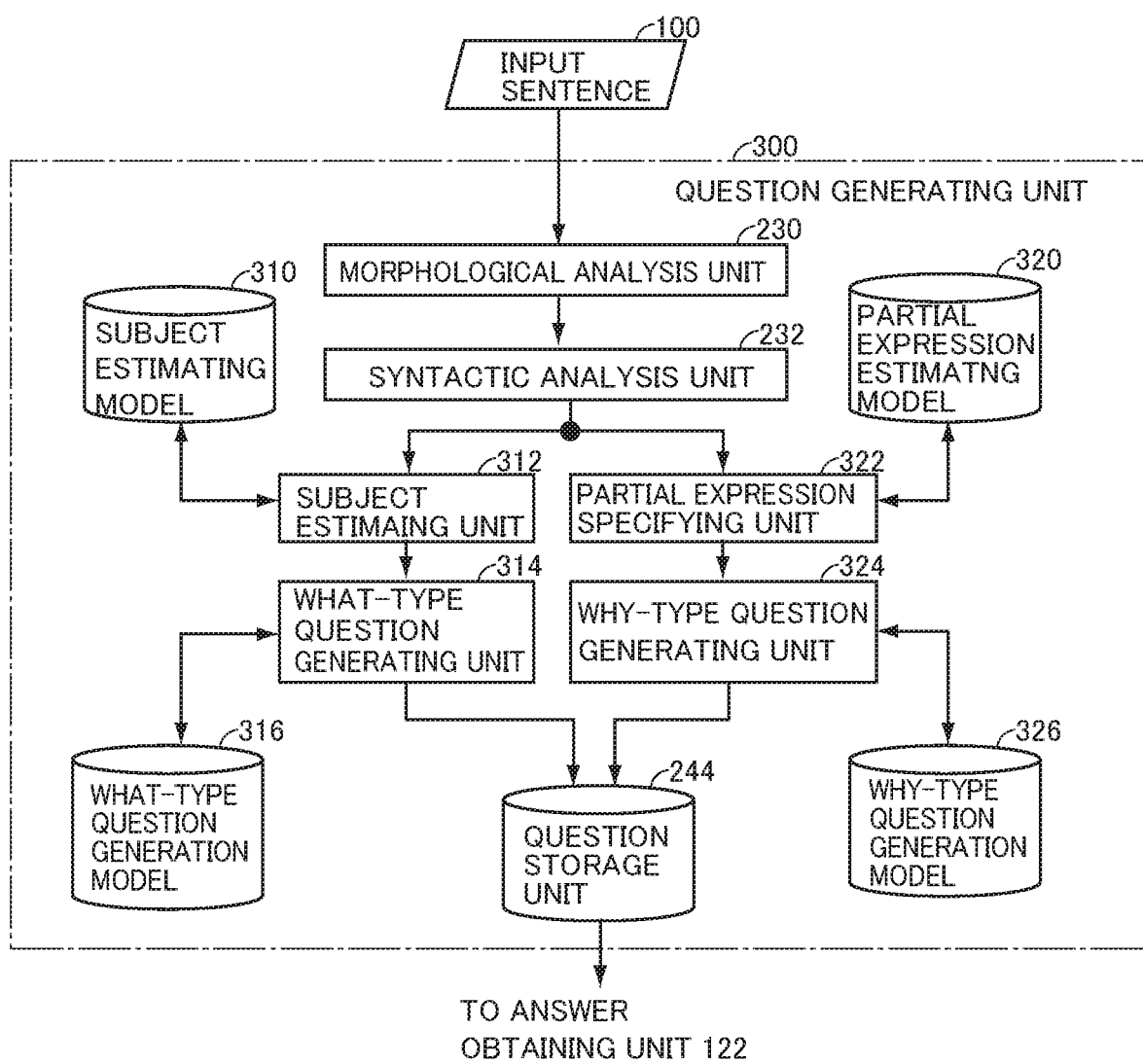
FIG. 8 is a block diagram schematically showing a question generating unit of the dialogue system in accordance with a second embodiment.
Figure 9:
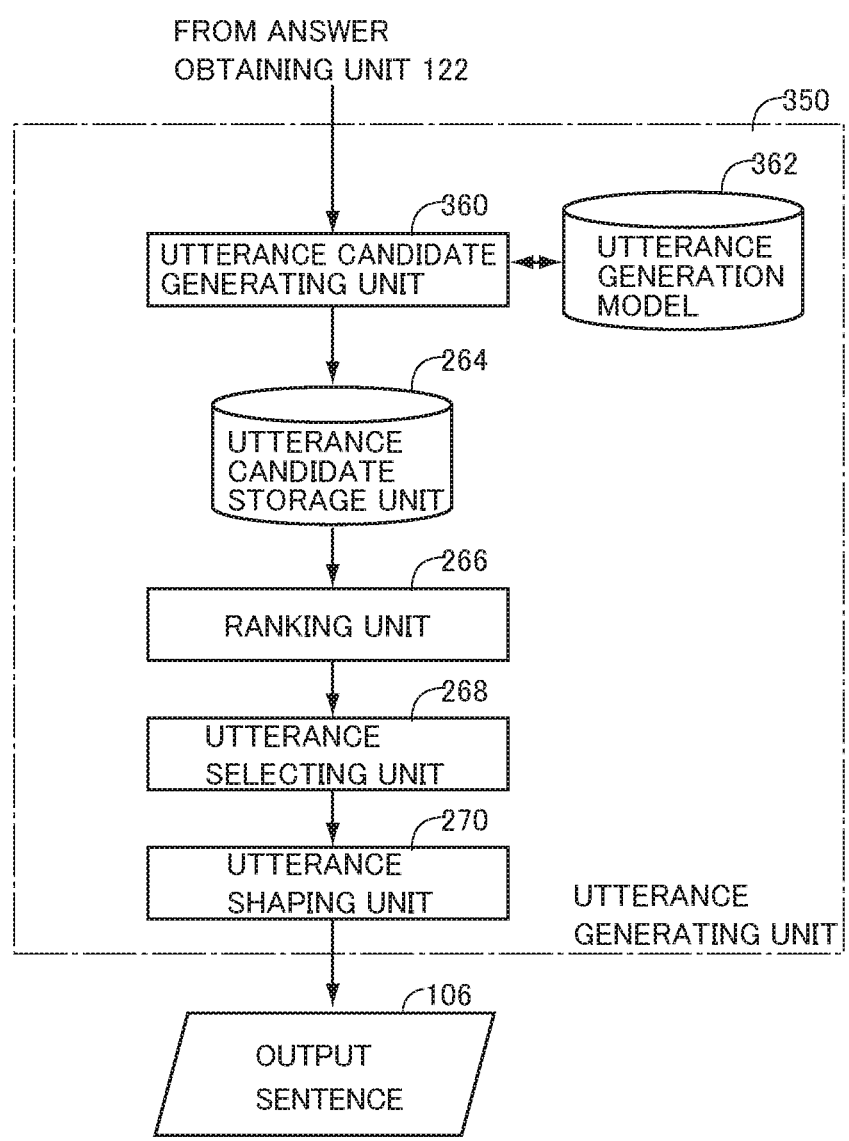
FIG. 9 is a block diagram schematically showing an utterance generating unit of the dialogue system in accordance with the second embodiment.

In the first embodiment, a question is generated in accordance with question generation rules. Generation of questions is relatively easy to regularize. Therefore, it is possible to utilize rules as described above. The present invention, however, is not limited to the first embodiment that uses question generation rules. Questions may be generated not in accordance with rules but by using a statistic model. The second embodiment is configured to do so. In the second embodiment, a question generating unit 300 shown in FIG. 8 is used in place of question generating unit 120 shown in FIG. 6, and an utterance generating unit 350 shown in FIG. 9 is used in place of utterance generating unit 124 shown in FIG. 7. Other components of the second embodiment are the same as those of the first embodiment.

Referring to FIG. 8, question generating unit 300 includes: a morphological analysis unit 230 connected to receive an input sentence 100; and a syntactic analysis unit 232 connected to receive an output from morphological analysis unit 230. Question generating unit 300 further includes: a subject estimating model 310 statistically learned in advance; a subject estimating unit 312 generating a prescribed feature vector from the input sentence 100 having syntactic analysis information added, output from syntactic analysis unit 232, and estimating a subject of the input sentence 100 with reference to subject estimating model 310; a what-type question generation model 316 trained in advance such that given a subject of dialogue, what-type question hypotheses and their likelihood information are output based on the subject; and a what-type question generating unit 314 extracting features from the subject output from subject estimating unit 312 and generating a what-type question using what-type question generation model 316.

Question generating unit 300 further includes: a partial expression estimating model 320 trained in advance such that, given a prescribed feature vector obtained from the input sentence 100 having the syntactic analysis information added, partial expression hypotheses each including a u-nary phrase included in the input sentence 100 and their likelihood information are output; and a partial expression specifying unit 322 extracting prescribed features from the input sentence 100 having the syntactic analysis information added, output from syntactic analysis unit 232, applying the features as a feature vector to partial expression estimating model 320, and based on the partial expression hypotheses and their likelihood information output therefrom, specifying a partial expression in the input sentence 100.

Question generating unit 300 further includes: a why-type question generation model 326 trained in advance such that, given prescribed features extracted from a partial expression, question hypotheses for generating why-type questions and their likelihood information are output based on the partial expression; a why-type question generating unit 324 for extracting features from the partial expression specified by partial expression specifying unit 322 and applying them to why-type question generation model 326, and based on its output, generating a why-type question for appropriately controlling the dialogue in response to an input sentence 100; and a question storage unit 244 for storing the what-type questions generated by what-type question generating unit 314 and the why-type questions generated by why-type question generating unit 324.

On the other hand, referring to FIG. 9, utterance generating unit 350 in accordance with the second embodiment includes: an utterance generation model 362 trained in advance to output, given any sentence as material for utterance, utterance hypotheses to be output to the user based on the sentence and their likelihood information; an utterance candidate generating unit 360, receiving an answer from question-answering system 104 (see FIG. 1) through answer obtaining unit 122 (see FIG. 1), inputting the answer to utterance generation model 362, and generating utterance candidates based on the utterance hypotheses and their likelihood information output from utterance generation model 362; and utterance candidate storage unit 264 for storing utterance candidates generated by utterance candidate generating unit 360 and ranking unit 266, utterance selecting unit 268 and utterance shaping unit 270 connected in the similar manner as shown in FIG. 7.

The system in accordance with the second embodiment operates in the following manner. Here, only the operations of question generating unit 300 and utterance generating unit 350 will be described.

When an input sentence 100 is applied to morphological analysis unit 230 of question generating unit 300 shown in FIG. 8, morphological analysis unit 230 performs a morphological analysis on the input sentence 100 and applies a morpheme sequence to syntactic analysis unit 232. Syntactic analysis unit 232 performs a syntactic analysis on the morpheme sequence, and applies the input sentence 100 having syntactic analysis information added, to subject estimating unit 312 and partial expression specifying unit 322.

Subject estimating unit 312 extracts features to be applied to subject estimating model 310 from the syntactic analysis information and the input sentence 100, applies the features in the form of a feature vector to subject estimating model 310, and based on the subject hypotheses and their likelihood information output therefrom, estimates the subject of input sentence 100. Subject estimating unit 312 applies the subject to what-type question generating unit 314. What-type question generating unit 314 obtains features for what-type question generation model 316 based on the subject, and applies the features in the form of a feature vector, to what-type question generation model 316. Based on question hypotheses and their likelihood information output from what-type question generation model 316, what-type question generating unit 314 generates what-type questions, which are stored in question storage unit 244.

On the other hand, partial expression specifying unit 322 extracts features for estimating a partial expression from the syntactic analysis information applied from syntactic analysis unit 232 and input sentence 100, and applies the features in the form of a feature vector to partial expression estimating model 320. Based on the feature vector, partial expression estimating model 320 outputs partial expression hypotheses in the input sentence 100 and their likelihood information. Partial expression specifying unit 322 estimates a partial expression based on the likelihood information, and applies the partial expression to why-type question generating unit 324. Based on the partial expression, why-type question generating unit 324 forms a feature vector for generating a why-type question, and applies it to why-type question generation model 326. Receiving the feature vector, why-type question generation model 326 outputs hypotheses of why-type question and their likelihood information. Based on the question hypotheses and their likelihood information, why-type question generating unit 324 generates question candidates, which are stored in question storage unit 244. It is noted that both the what-type question generating unit 314 and the why-type question generating unit 324 generate question candidates.

Answer obtaining unit 122 shown in FIG. 1 applies these questions to question-answering system 104, and thereby obtains answers from question-answering system 104. Question-answering system 104 applies these answers to utterance candidate generating unit 360 of utterance generating unit 350 shown in FIG. 9. Utterance candidate generating unit 360 extracts a feature vector for utterance generation model 362 from each of these answers, applies it to utterance generation model 362, and based on utterance hypotheses and their likelihood information output therefrom, generates utterance candidates. Utterance candidate generating unit 360 stores the utterance candidates generated based on the outputs from utterance generation model 362 in utterance candidate storage unit 264. It is noted that each of the utterance candidates generated based on the utterance hypotheses and their likelihood information output from utterance generation model 362 has a score added by utterance generation model 362. The score indicates the plausibility of each utterance candidate to a given feature vector.

Operations of ranking unit 266, utterance selecting unit 268 and utterance shaping unit 270 are the same as those in the first embodiment. Ranking by ranking unit 266 is also the same as in the first embodiment. It is noted, however, that the score added by utterance generation model 362 to each utterance candidate is used in the second embodiment, rather than the importance of utterance rules. Further, in the present embodiment, questions applied to question-answering system 104 also have scores added by subject estimating model 310, what-type question generation model 316, partial expression estimating model 320 and why-type question generation model 326 in question generating unit 300. Therefore, these scores may be reflected in the final scoring of utterance candidates.

[Third Embodiment]

In the second embodiment, an utterance generation model 362 is used. Utterance generation model 362 is applied to an answer from question-answering system 104 and outputs answer hypotheses together with their likelihood information.

However, the answers from question-answering system 104 may vary very widely depending on the variations of questions. In such a case, training data for training utterance generation model 362 becomes sparse, possibly lowering the accuracy of generating utterance candidates using the utterance generation model 362. Therefore, in the third embodiment, assuming, for example, that the training data includes a u-nary phrase, a noun therein is replaced by an abstracted variable and then, the utterance generation model is trained, to solve this problem. Here, it follows that hypotheses output from the utterance generation model also include variables.

Figure 10:
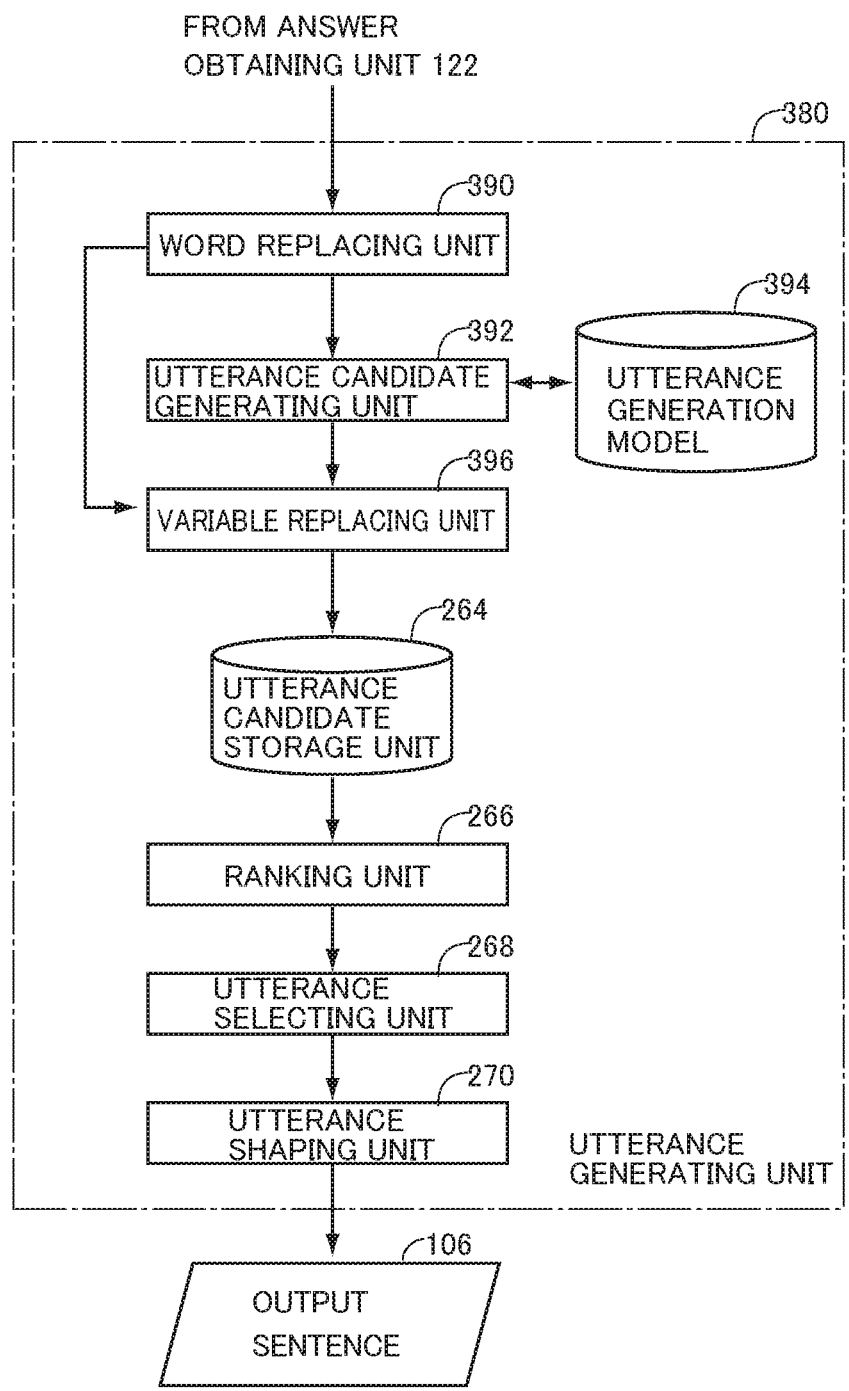
FIG. 10 is a block diagram schematically showing an utterance generating unit of the dialogue system in accordance with a third embodiment.

Referring to FIG. 10, an utterance generating unit 380 in accordance with the third embodiment includes an utterance generation model 394, pre-trained as described above, in place of utterance generation model 362 in FIG. 9; a word replacing unit 390 for replacing a noun portion of a u-nary phrase in an answer from the question-answering system applied from answer obtaining unit 122 to a variable symbol; an utterance candidate generating unit 392 for extracting features from an answer including the variable symbol applied from word replacing unit 390 and for applying the features as a feature vector to utterance generation model 394, thereby causing utterance generation model 394 to output utterance hypotheses including variable symbols together with their likelihood information, and based on these, generating utterance candidates; and a variable replacing unit 396 for replacing a variable symbol included in an utterance candidate output from utterance candidate generating unit 392 with the original word replaced by word replacing unit 390 and thereby completing an utterance candidate, and storing it in utterance candidate storage unit 264.

In other respects, the configuration and the operation of utterance generating unit 380 are the same as those of utterance generating unit 350 shown in FIG. 9.

By the device in accordance with the present embodiment, it is possible to prevent the training data for utterance generation model 394 from becoming sparse, and hence, to improve accuracy of generating utterance candidates by the model.

[Fourth Embodiment]

In the first to third embodiments described above, dialogue device 102 and the like sends a question in a natural language to question-answering system 104 and generates the next utterance using its answer, to control the dialogue. The present invention, however, is not limited to such embodiments. In place of question-answering system 104, any system can be used provided that it has a scheme of outputting information for the dialogue in response to any parameter generated from an input sentence. For example, a general system such as question-answering system 104 shown in FIG. 1 includes a core system for searching for or forming information to respond to a question, an input interface unit for generating parameters to be applied to the core system, and an output interface generating a response sentence by using the information (for example, a group of words) for generating a response output from the core system, and transmitting the response to a terminal, for example, that has sent the question.

If an external device has the same function as the input/output interface, it is unnecessary for the external device to generate natural language sentences separately and to apply them to the device, and what is necessary is simply to apply results of analysis of questions tailored to the specification of input to the core system. Further, outputs from the core system are applied as responses to the external device in the form of a natural language through an external interface. If the external device is not human, it is unnecessary to convert the outputs from the core system to any natural language. The outputs from the core system may be received directly and the external device may process them as needed. The fourth embodiment is directed to such a system.

Figure 11:
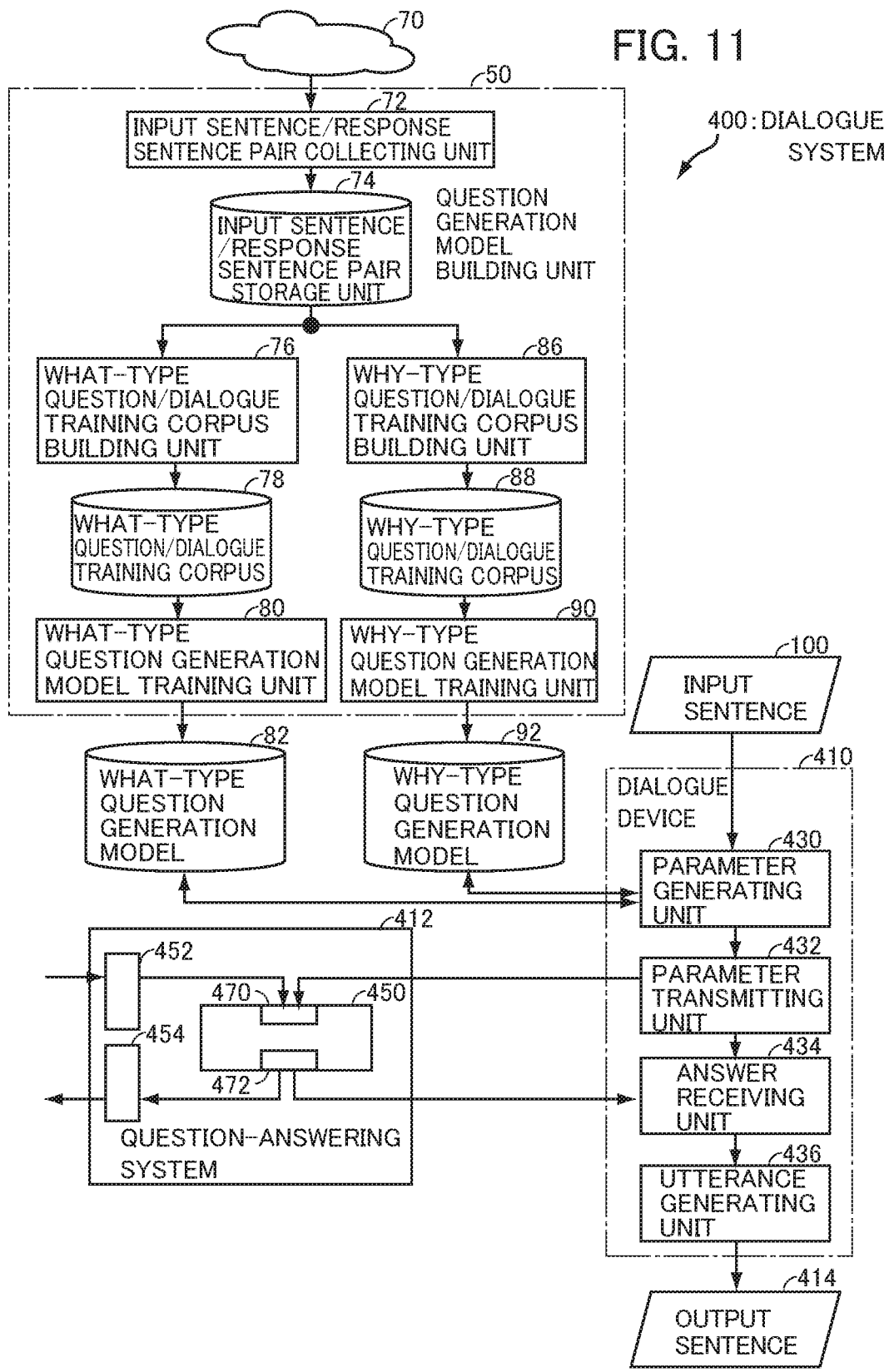
FIG. 11 is a block diagram showing an overall configuration of a dialogue system in accordance with a fourth embodiment.

Referring to FIG. 11, a dialogue system 400 in accordance with the fourth embodiment includes a question generation model building unit 50, a what-type question generation model 82 and a why-type question generation model 92 having the same configurations as those in the first embodiment and, in addition, it includes, in place of dialogue device 102 of the first embodiment, a dialogue device 410 that generates, in response to input sentence 100, parameters representing a question to be directly applied to core system 450 of an external question-answering system 412, from natural language sentences generated by what-type question generation model 82 and why-type question generation model 92, applies the parameters to question-answering system 412, and based on the information obtained from question-answering system 412, generates an output sentence 414.

Dialogue device 410 includes: a parameter generating unit 430 receiving an input sentence 100 for generating, from question sentences obtained by what-type question generation model 82 and why-type question generation model 92, parameters to be applied to the core system of question-answering system 412; a parameter transmitting unit 432 for directly transmitting the parameters generated by parameter generating unit 430 to the core system of question-answering system 412; an answer receiving unit 434 for receiving information to generate an answer, output from question-answering system 412 in response to the parameters; and an utterance generating unit 436 for generating and outputting an utterance in response to input sentence 100 based on the information answer receiving unit 434 receives.

Question-answering system 412 includes: a core system 450; an input interface 452 for analyzing a question applied externally in the form of a natural language, and generating and applying parameters to core system 450; and an output interface 454 for receiving, from core system 450, information output by core system 450 in response to the question, generating a natural language sentence from the information and outputting it as a response. Core system 450 includes: an input unit 470 for receiving input parameters from input interface 452; and an output unit 472 for outputting the information generated by the core system for generating a response to the question.

Typically, input interface 452 receives an input of a question sentence in a natural language from an external device, analyzes the same, generates input parameters for core system 450, and applies them to input unit 470. In response, core system 450 searches the internal DB for information to respond, and outputs the information through output unit 472. Based on this information, output interface 454 generates and outputs a natural language sentence suitable as a response.

Such an operation, however, assumes that the question sentence is input by a human. When dialogue device 410 uses question-answering system 412 as in the present embodiment, input/output using a natural language is unnecessary. Therefore, in the present embodiment, parameter generating unit 430 directly applies the parameters representing a question to input unit 470 of core system 450, and the information from core system 450 is directly received by answer receiving unit 434 from output unit 472. From the group of words, utterance generating unit 436 generates the next utterance to be given to the user and outputs it as an output sentence 414.

In this manner, interaction in a natural language to and from question-answering system 412 becomes unnecessary and, hence, dialogue using the core system of question-answering system 412 becomes more efficient.

What-type question generation model 82 and why-type question generation model 92 may be trained such that, given an input sentence, the models can directly generate parameters of a question suitable for core system 450, in accordance with characteristics or specification of core system 450 of question-answering system 412, thereby attaining higher efficiency. By way of example, in place of what-type question generation model 82 and why-type question generation model 92, models trained to generate, given an input sentence, parameters to be directly applied to core system 450, rather than to generate a question sentence, may be used. For this purpose, in question generation model building unit 50, the models are trained using input sentences and parameters equivalent to the corresponding questions in place of the sets of input sentence and corresponding question sentence. If such models are used, in response to an input sentence 100, parameters equivalent to questions will be obtained from what-type question generation model 82 and why-type question generation model 92. Parameter generating unit 430 can directly apply the parameters to core system 450 through parameter transmitting unit 432 without any processing of the parameters.

The parameters generated by parameter generating unit 430 depends on the input specification of core system 450. Therefore, if the input specification of core system 450 is not available, the dialogue device 410 of the present embodiment cannot be used.

Since the parameters generated by parameter generating unit 430 depends on the specification of core system 450, if a plurality of question-answering systems having core systems of different specifications are to be used, it becomes necessary to substantially combine a plurality of what-type question generation models 82, why-type question generation models 92 and dialogue devices 410.

As described above, by the present invention, dependency relation of a user's utterance is effectively used in generating a response to the user's utterance. Further, when a statistic model used in the system is to be generated, dialogue information actually appearing on the web and SNS is used as a base. Therefore, unnatural flow of dialogue can be prevented. Further, from many pieces of information included in utterances, pieces of information unnecessary to generate a question to the question-answering system are removed. This makes it possible to generate a relevant system utterance that leads to a natural dialogue in response to a user's utterance. Further, since the question to the question-answering system is generated based on the user's utterance and an utterance is generated using the answer to the question, it is possible to grasp the relation between the user's utterance and the system utterance from the generated question, and thus, the system utterance and the flow of dialogue can be controlled.

[Computer Implementation]

Figure 12:
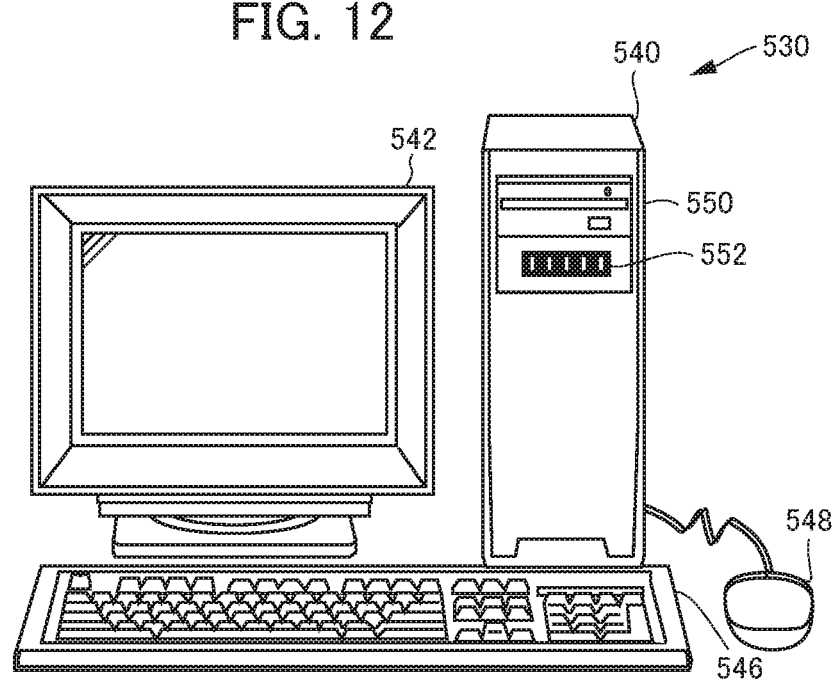
FIG. 12 shows an appearance of a computer system realizing the dialogue system in accordance with the embodiments of the present invention.

The dialogue system, the dialogue device and the question generation model building unit in accordance with the embodiments of the present invention can be implemented by computer hardware and a computer program executed on the computer hardware. FIG. 12 shows an appearance of a computer system 530 and FIG. 13 shows an internal configuration of computer system 530.

Referring to FIG. 12, computer system 530 includes a computer 540 having a memory port 552 and a DVD (Digital Versatile Disk) drive 550, a keyboard 546, a mouse 548, and a monitor 542.

Figure 13:
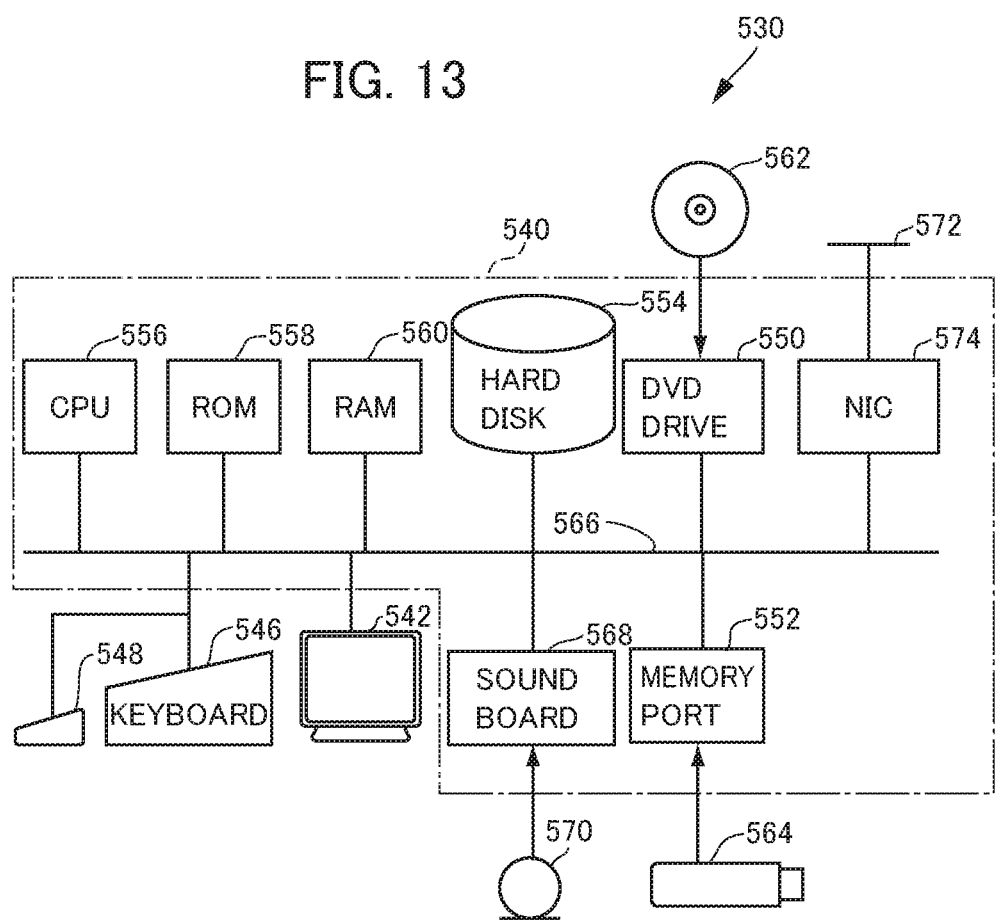
FIG. 13 is a block diagram showing an internal configuration of the computer system of which appearance is shown in FIG. 12.

Referring to FIG. 13, computer 540 includes, in addition to memory port 552 and DVD drive 550, a CPU (Central Processing Unit) 556, a bus 566 connected to CPU 556, memory port 552 and DVD drive 550, a read only memory (ROM) 558 storing a boot program and the like, a random access memory (RAM) 560 connected to bus 566, storing program instructions, a system program and work data, and a hard disk 554. Computer system 530 further includes a sound board 568 connected to bus 566, for digitizing speech signals to a format processable by the computer, and a network interface card (NIC) 574 providing a connection to a network 572 allowing communication with another terminal. A microphone 570 is connected to sound board 568.

The computer program causing computer system 530 to function as each functional unit of dialogue system of the above-described embodiments is stored in a DVD 562 or a removable memory 564 loaded onto DVD drive 550 or to memory port 552, and transferred to hard disk 554. Alternatively, the program may be transmitted to computer 540 through network 572, and stored in hard disk 554. At the time of execution, the program is loaded to RAM 560. The program may be directly loaded from DVD 562, removable memory 564 or through network 572 onto RAM 560.

The program includes a plurality of instructions to cause computer 540 to function as each functional unit of the dialogue system of the above-described embodiments. Some of the basic functions necessary to cause computer 540 to perform these operations are provided by the operating system running on computer 540, by a third party program, or by various dynamically linkable programming tool kits or program library, installed in computer 540. Therefore, the program may not necessarily include all of the functions necessary to realize the system, device and method of the present embodiment. The program has to include only those instructions that realize the functions of the above-described system, device or method by dynamically calling, at the time of execution, appropriate functions or appropriate program tools in a program tool kit or program library in a manner controlled to attain desired results. Naturally, all the necessary functions may be provided by the program only.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

As described above, the present invention is usable in situations where a dialogue with a user is necessary in every field of industry and, specifically, the present invention is applicable to devices and services in which a natural dialogue is of high importance, as well as to an interface for such devices and services.

REFERENCE SIGNS LIST 30, 400 dialogue system
50 question generation model building unit
70 Internet
72 input sentence/response sentence pair collecting unit
74 input sentence/response sentence pair storage unit
76 what-type question/dialogue training corpus building unit
78 what-type question/dialogue training corpus
80 what-type question generation model training unit
82 what-type question generation model
86 why-type question/dialogue training corpus building unit
88 why-type question/dialogue training corpus
90 why-type question generation model training unit
92 why-type question generation model
100 input sentence
102, 410 dialogue device
104, 412 question-answering system
106, 414 output sentence
120, 300 question generating unit
122, 194 answer obtaining unit
124, 350, 380, 436 utterance generating unit
130 candidate pair collecting unit
132 length checking unit
134, 230 morphological analysis unit
136, 232 syntactic analysis unit
140 entailment dictionary
142 binary pattern dictionary
146 question generation rule storage unit
150 pattern comparing unit
152 cleaning unit
154, 192 question sentence generating unit
156, 200 record forming unit
158, 202 corpus adding unit
170 predicate extracting unit
172 predicate matching unit
174, 198 pair selecting unit
190 partial expression extracting unit
196 question-answering system
234 what-type question feature extracting unit
236, 314 what-type question generating unit
240 why-type question feature extracting unit
242, 324 why-type question generating unit
244 question storage unit
260, 360, 392 utterance candidate generating unit
262 utterance generation rule storage unit
264 utterance candidate storage unit
266 ranking unit
268 utterance selecting unit
270 utterance shaping unit
268 utterance selecting unit
310 subject estimating model
312 subject estimating unit
316 what-type question generation model
320 partial expression estimating model
322 partial expression specifying unit
326 why-type question generation model
362, 394 utterance generation model
390 word replacing unit
396 variable replacing unit
430 parameter generating unit
432 parameter transmitting unit
434 answer receiving unit
450 core system

The invention claimed is:

1. A dialogue system, comprising:
a processor configure to:
receive an input utterance from a user;
generate a question a based on an expression included in the input utterance;
input the generated question to a question-answering system;
obtain from the question-answering system an answer to the inputted question; and
generate a response to said input utterance based on the obtained answer.

2. The dialogue system according to claim 1, wherein the processor is further configured to:
perform an analysis on said input utterance and generate a result from the analysis, wherein the analysis of said input utterance includes performing a morphological analysis and a syntactic analysis on said input utterance;
presume a subject of said input utterance based on the analysis result; and
a generate, based on the presumed subject, a factoid-type question including a partial expression forming said presumed subject.

3. The dialogue system according to claim 1, wherein the processor is additionally configured to:
specify a partial expression representing said input utterance, from the analysis result; and
generate, based on the specified partial expression, a non-factoid-type question.

4. The dialogue system according to claim 1, wherein the processor is also configured to;
generate an utterance candidate by applying an utterance generating rule prepared in advance for said answer; and
shape said utterance candidate in accordance with an utterance shaping rule prepared in advance, and thereby generating said response to said input utterance.

5. The dialogue system according to claim 1, wherein the processor is additional configured to:
execute an utterance generation model trained in advance such that when an answer to a question is given, said utterance generation model generates an utterance from the answer; and
shape said utterance generated by said utterance generation model in accordance with an utterance shaping rule prepared in advance, and thereby generating said response to said input utterance.

6. A computer program stored on a non-transient computer readable medium causing a computer to function as the processor according to claim 1.

* * * * *